(12) United States Patent
Karst

(10) Patent No.: US 11,167,870 B2
(45) Date of Patent: Nov. 9, 2021

(54) PACKAGING MACHINE WITH CARTON FEEDING SYSTEM

(71) Applicant: Graphic Packaging International, LLC, Atlanta, GA (US)

(72) Inventor: Pete Karst, Canton, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 185 days.

(21) Appl. No.: 16/372,549

(22) Filed: Apr. 2, 2019

(65) Prior Publication Data
US 2019/0308758 A1    Oct. 10, 2019

Related U.S. Application Data

(60) Provisional application No. 62/653,129, filed on Apr. 5, 2018.

(51) Int. Cl.
*B65B 11/00* (2006.01)
*B65B 43/14* (2006.01)
(Continued)

(52) U.S. Cl.
CPC .......... *B65B 11/004* (2013.01); *B65B 43/126* (2013.01); *B65B 43/145* (2013.01); *B65B 43/185* (2013.01); *B65B 27/04* (2013.01); *B65B 35/02* (2013.01); *B65B 35/44* (2013.01); *B65B 39/007* (2013.01); *B65B 2210/04* (2013.01); *B65G 2201/0244* (2013.01); *B65G 2201/0252* (2013.01)

(58) Field of Classification Search
CPC ... B65B 43/126; B65B 43/145; B65B 43/205; B65B 43/185; B65B 41/08; B65B 41/18; B65B 59/005; B65B 11/004; B65B 11/105; B65B 21/24; B65B 21/242; B65B 43/165; B65B 43/265; B65B 43/305; B31B 50/022; B31B 50/024; B31B 50/042; B31B 50/062; B65G 2201/022
See application file for complete search history.

(56) References Cited

U.S. PATENT DOCUMENTS 2,817,520 A * 12/1957 Gentry ................ B65B 43/145
271/101
3,127,720 A * 4/1964 Garrard ................ B65B 11/105
53/48.7
(Continued)

OTHER PUBLICATIONS

International Search Report and Written Opinion for PCT/US2019/025283 dated Jul. 18, 2019.

*Primary Examiner* — Joshua G Kotis
(74) *Attorney, Agent, or Firm* — Womble Bond Dickinson (US) LLP

(57) ABSTRACT

A packaging machine includes a series of stations or assemblies for packaging a series of products. A carton feeding system and a product conveyor that receives a series of articles or products are provided at a first, upstream or intake end of the packaging machine. The carton feeding system feeds carton blanks into registration with products, which generally can be grouped to form 4, 6, 8 packs, etc. Thereafter, the product groups, with the carton blanks applied thereto, will be moved through one or more downstream folding and wrapping or packaging assemblies or stations of the packaging machine.

14 Claims, 11 Drawing Sheets

(51) Int. Cl.
  *B65B 43/18*  (2006.01)
  *B65B 43/12*  (2006.01)
  *B65B 35/44*  (2006.01)
  B65B 27/04  (2006.01)
  B65B 39/00  (2006.01)
  B65B 35/02  (2006.01)

(56) References Cited

U.S. PATENT DOCUMENTS

| | | | |
|---|---|---|---|
| 3,142,232 A * | 7/1964 | Pierce, Jr. | B65B 43/305 |
| | | | 493/310 |
| 3,253,381 A * | 5/1966 | Wood | B65B 11/105 |
| | | | 53/398 |
| 3,295,291 A * | 1/1967 | Wood | B65B 11/105 |
| | | | 53/398 |
| 3,701,230 A * | 10/1972 | Gentry | B65B 21/24 |
| | | | 53/48.7 |
| 3,940,907 A * | 3/1976 | Ganz | B65B 21/24 |
| | | | 53/48.1 |
| 4,023,328 A * | 5/1977 | Calvert | B65B 21/06 |
| | | | 53/157 |
| 4,062,270 A * | 12/1977 | Culpepper | B65D 71/14 |
| | | | 493/137 |
| 4,697,973 A | 10/1987 | Hahn et al. | |
| 4,727,708 A | 3/1988 | Conforto et al. | |
| 4,982,551 A | 1/1991 | Nigrelli, Sr. | |
| 5,154,041 A | 10/1992 | Schneider | |
| 5,501,318 A | 3/1996 | Disrud | |
| 5,511,772 A * | 4/1996 | Ganz | B65B 43/185 |
| | | | 271/108 |
| 5,638,659 A | 6/1997 | Moncrief et al. | |
| 5,653,671 A | 8/1997 | Reuteler | |
| 5,673,536 A | 10/1997 | Easter et al. | |
| 5,724,785 A | 3/1998 | Malanowski | |
| 5,782,734 A | 7/1998 | Reuteler | |
| 6,311,457 B1 | 11/2001 | May et al. | |
| 6,490,843 B1 | 12/2002 | May | |
| 6,505,458 B1 | 1/2003 | Corniani et al. | |
| 6,550,608 B1 | 4/2003 | Brown et al. | |
| 6,575,886 B1 | 6/2003 | Tanck et al. | |
| 7,503,447 B2 | 3/2009 | Ford | |
| 7,594,646 B2 | 9/2009 | Flagg et al. | |
| 8,246,290 B2 | 8/2012 | May et al. | |
| 8,870,519 B2 | 10/2014 | Karst | |
| 9,365,358 B2 | 6/2016 | Barber et al. | |
| 9,573,710 B2 | 2/2017 | Hendricks | |
| 9,764,904 B2 | 9/2017 | Barber et al. | |
| 9,776,750 B2 | 10/2017 | May et al. | |
| 2006/0089244 A1 | 4/2006 | Martini | |
| 2007/0001363 A1 | 1/2007 | Flagg et al. | |
| 2007/0022714 A1 | 2/2007 | Flagg | |
| 2007/0220836 A1 | 9/2007 | Reuteler et al. | |
| 2011/0030311 A1* | 2/2011 | Martini | B65B 43/185 |
| | | | 53/154 |
| 2013/0042580 A1 | 2/2013 | May et al. | |
| 2013/0064636 A1 | 3/2013 | Karst | |
| 2013/0111855 A1 | 5/2013 | Hendricks | |

* cited by examiner

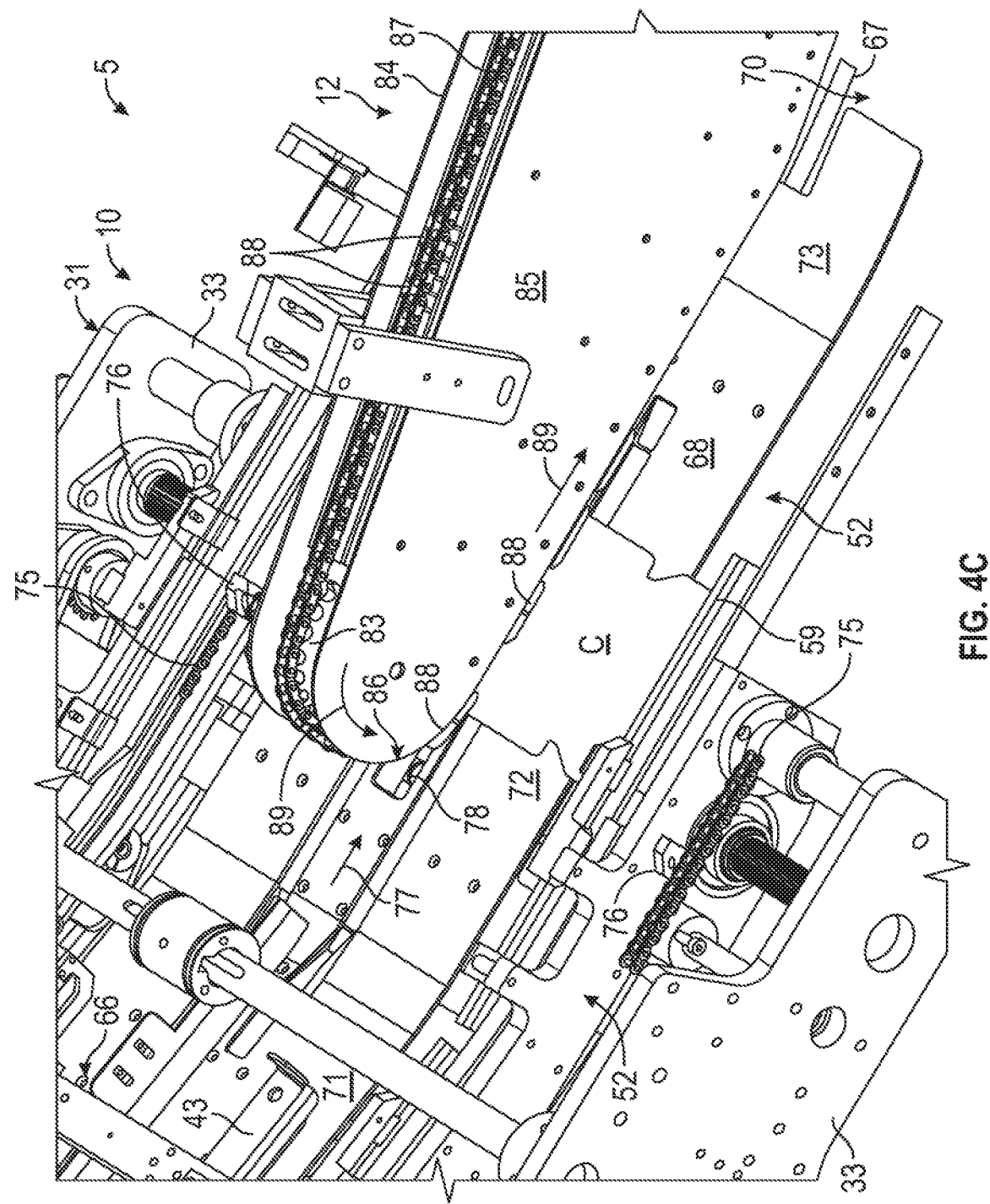

PACKAGING MACHINE WITH CARTON FEEDING SYSTEM

CROSS REFERENCE TO RELATED APPLICATIONS

The present Patent Application is a formalization of previously filed, U.S. Provisional Patent Application Ser. No. 62/653,129, filed Apr. 5, 2018 by the inventor named in the present application. This patent application claims the benefit of the filing date of this cited Provisional Patent Application according to the statutes and rules governing provisional patent applications, particularly 35 U.S.C. § 119(e), and 37 C.F.R. §§ 1.78(a)(3) and 1.78(a)(4). The specification and drawings of the Applications referenced above are specifically incorporated herein by reference as if set forth in their entirety.

FIELD OF THE INVENTION

The present invention relates to a packaging machine, and in particular, to packaging machines that incorporate carton feeding systems or stations for feeding cartons or carton blanks into engagement with a product or series of products for packaging.

BACKGROUND

Packaging machinery that places products, such as cans, bottles and other articles into cartons, such as paperboard cartons, are well known. These packaging machines include, but are not limited to, those which place articles or products into a wrap-type cartons, basket-type cartons or sleeve-type cartons. One example of a packaging machine that packages articles, such as cans or bottles, into a wrap-type carton is the Marksman® line of machines, including the Marksman® MM2400 brand machine manufactured by Graphic Packaging International, LLC. Other types of packaging machines are especially adapted to package products into sleeve-type or fully enclosed cartons and basket-type cartons, such as Graphic Packaging International, LLC's Quikflex® and Autoflex® brand machines. Many of these machines include one or more elongate conveyor systems that can extend from a carton blank feeder positioned at a first end or upstream section, to a second end or downstream section where the filled cartons or packs are discharged. The conveyor moves articles, such as bottles or cans, and the carton blanks that receive or are applied to the articles to form filled packs through the machine toward the downstream or discharge end thereof. Positioned along the conveyor are various units or stations that incorporate the necessary components that perform required packaging functions.

For example, in packaging machines designed to process wrap-type cartons, the products generally are delivered to the upstream section of the machine in mass, and moved to an article or product selection station where they are grouped into desired configurations, such as a 2 by 3 article group, a 2 by 2 group, or a 2 by 4 group of articles. Other group configurations are possible. A carton blank feeder further delivers carton blanks, generally one at a time, to a station that wraps each blank around a formed article group, such as a group of six articles (a "6 pack") arranged in a 2×3 configuration. These wrap-type carton blanks can have locking features, typically tabs and either slits or holes, that cooperate or engage with one another on opposite bottom edges to close and lock the wrap-type carton blank around the article group. After the carton blanks are wrapped around the article group, the group is held securely within the now formed and filled carton or pack.

As used herein the term "carton blank" refers to either a flat blank or to a carton blank that has been partially constructed, for example by gluing, especially as in sleeve-type carton blanks. The term "carton" or "pack" refers to a carton blank that has been fully assembled either around or that receives the articles therein or otherwise contains the articles. Carton blanks adapted to wrap around an article group and machine elements to accomplish such an operation are generally known, as shown in U.S. Pat. Nos. 5,673,536 and 6,550,608, both owned by Graphic Packaging International, LLC, the present owner of the inventions disclosed herein and both of which are incorporated in their entirety herein by reference.

Various Marksman® brand packaging machines have been developed by Graphic Packaging International, LLC and are in commercial use. These machines include features such a carton feeder in which cartons are pulled out of a magazine, and are fed between feed rollers and along a path of travel into engagement with and placed onto a group of articles. Such placement of the cartons generally must be done with substantial accuracy to ensure proper wrapping/application of the cartons to the articles. In conventional carton feeders, the cartons generally are passed from the feeder to an overhead conveyor that applies the cartons to the products, and at the same time, the speed of the cartons further generally must be quickly matched to the speed of the products moving therebelow at an engagement point between the cartons and the products.

Accordingly, it can be seen that a need exists for a carton feeding system that addresses the foregoing and other related and unrelated problems in the art.

SUMMARY

Briefly described, the present invention generally relates to packaging machines that include a carton feeding system for feeding carton blanks to a downstream wrapping or packaging station or section of the packaging machine, or other, similar assembly for application of the carton blanks to articles/products or groups of articles/products. In one embodiment, the carton feeding system generally is directed to the feeding of flat, wrap style carton blanks that are adapted to be folded or wrapped about articles or products such as bottles, cans, etc., moving through the packaging machine along a product conveyor for forming wrapped product packages such as six-packs, eight-packs, etc. However, it will be understood by those skilled in the art that the principles of the present invention can be applied for the feeding of various other types of cartons/carton blanks and packaging of various other types of products as needed or desired.

In one aspect, the packaging machine can include a series of stations or assemblies, including the carton feeding system and product conveyor that receives a series of articles or products at a first, upstream or intake end of the packaging machine. The products generally can be grouped into a series of products, such as for forming six-packs, eight-packs or other package configurations, and loaded or placed into flights of the product conveyor for movement through the packaging machine. For example, the packaging machine can include an intake end that receives a product conveyor moving a series of products through the packaging machine; a carton magazine for supplying a stack of carton blanks downstream from the magazine and having a frame, a picking assembly arranged adjacent the magazine and configured to selectively pick carton blanks from the magazine and feed the carton blanks to a carton chute that extends away from the magazine and toward the product conveyor.

An overhead lug conveyor can be located downstream from the carton feeding system and can have a series of carton lugs movable into engagement with the carton blanks fed to and moving along the carton chute for urging the carton blanks into registration with corresponding products or groups of products moving along the product conveyor. The overhead lug conveyor will be received at least partially within the frame of the carton feeding system, extending above and substantially aligned with the carton chute to a location adjacent a release point. As the carton blanks are released from engagement by the carton lugs along the carton chute, the carton blanks are engaged by the lugs of the overhead lug conveyor and their movement along the carton chute and toward registration with the corresponding products or groups of products is continued, with the lugs of the overhead conveyor having a pitch and moving at a rate that imparts a rate of movement to the carton blanks that substantially matches a rate of movement of the products along the product conveyor.

Thereafter, the product groups, with the carton blanks applied thereto, will be moved though one or more downstream folding and wrapping or packaging assemblies or stations of the packaging machine. As the carton blanks and the products of product groups to which they are applied are moved through the at least one packaging or wrapping station downstream from the carton feeding system, the carton blanks will be applied about their corresponding products or product groups to form a series of product packages.

For example, as the groups of products pass through the one or more wrapping or packaging station(s), the carton blanks can be folded thereabout, and locking tabs or other locking features of the carton blanks can be engaged to substantially secure the cartons in a wrapped condition thereabout. Alternatively or additionally, adhesive applicators can be aligned along the path of travel of the cartons and products to apply an adhesive if needed or desired to help secure the panels and/or flaps of the carton blanks in a wrapped configuration around the products.

The completed cartons or packages then can be passed through a discharge station, which can include compression belts and a metering assembly that controls the release/discharge of the completed packages. The packages also can be passed to a divider station, where the packages can be divided into lanes and/or turned as needed to help reorient the packages for discharge from the packaging machine.

The carton feeding system generally will be mounted or located at an upstream end of the packaging machine, and can be mounted above an infeed portion of the product conveyor for the packaging machine. The carton feeding system includes a framework with opposed side plates and a magazine arranged at the upstream end thereof for receiving and presenting a stack of cartons to a pick point for feeding. A carton picking assembly is movable into engagement with a leading carton blank of the stack of carton blanks within the magazine. The carton picking assembly picks and pulls the leading carton blank from the magazine and transfers the carton blank to a carton chute that extends forwardly along the framework of the carton feeding system. The carton chute can include opposing guide and support plates along which the carton blanks are received, and a series of carton lugs carried by feeder chains or belts for engaging and driving each carton blank away from the carton picking device and along the carton chute.

In another aspect of the present disclosure, the overhead lug conveyor generally is extended into and can be cooperatively received within the framework of the carton feeding system. The overhead lug conveyor can have one or more conveyor chains or belts extending between spaced gears or sprockets at each end of the overhead lug conveyor. A drive motor further can be coupled to at least one of the drive gears or sprockets for driving rotation of the at least one chain or belt about an elongated path of travel. Alternatively, the at least one chain or belt can be linked to and driven by (e.g. by belts or otherwise indirectly driven) the same motor or drive for the product conveyor so as to move at a substantially matched rate or pitch therewith. The overhead lug conveyor further will include a series of overhead lugs mounted in spaced series along the at least one conveyor chain or belt. The overhead lugs are carried into engagement with the carton blanks as the carton blanks are within the carton chute, and will engage and take-over the movement of the carton blanks at a release point wherein the carton lugs are released from their driving engagement with the carton blanks while the carton blanks are still within the carton chute.

The overhead lug conveyor generally will be pitched so as to move the overhead lugs at a rate that substantially matches a rate or velocity of the articles being moved by the product conveyor. The upstream portion of the overhead lug conveyor further will be arranged over the carton chute of the carton feeding system, projecting or extending over and along the carton chute to a rearward location approximately aligned with a release point at which the cartons are released from engagement with the carton lugs, and additionally will be oriented at an angle that substantially tracks an angle at which the carton chute is oriented. In addition, the carton lugs of the carton feeder chains or belts further will be configured to shift or otherwise move away from driving engagement with the carton blanks moving along the carton chute as each carton blank is engaged by the lugs of the overhead lug conveyor.

According to one example aspect, a method of operating the packaging machine with the carton feeding system can include moving a series of products along a path of travel through the packaging machine; and picking carton blanks from a carton magazine and placing the carton blanks into a carton chute with the picking assembly of the carton feeding system. The picked carton blanks will be engaged by carton lugs that move the carton blanks along the carton chute and away from the picking assembly. The lugs of the overhead lug conveyor engage the carton blanks while the carton blanks are still within the carton chute, approximately at a release point where the carton blanks are disengaged from carton lugs moving the carton blanks along the carton chute, and with the lugs of the overhead conveyor arranged at a different pitch than the carton lugs. The lugs of the overhead conveyor continue to move the carton blanks along the carton chute and toward registration with the products moving along the product conveyor with the overhead lugs, wherein as the carton blanks approach registration with the products, the carton blanks are moving at a rate of movement substantially matched to a rate of movement of the products along the product conveyor. Thereafter, the carton blanks are moved into the one or more packaging or wrapping stations for applying the carton blanks to their corresponding products or groups of products to form a product package.

By engaging the carton blanks at a position and/or location substantially upstream from the point of registration and engagement of the carton blanks with the products and engaging the carton blanks with the overhead conveyor lugs while the carton blanks are within the carton chute and at a location and timing whereby the lugs of the feeder chains or belts are dropping away from engagement, the carton blanks are enabled to be moved and directed to the point of registration and engagement with an associated product or product group with the rate of movement of the carton blanks being controlled so as to be substantially matched with the speed of the products. This enables a substantially smooth and accurate transition of the carton blanks from the carton feeding system into registration with the associated or corresponding products or product groups, without requiring unneeded acceleration and/or rapid deceleration of the carton blanks between the picking and the placement of the carton blanks on their corresponding products/product groups.

Various objects, features and advantages of the present invention will become apparent to those skilled in the art upon a review of the following detailed description, when taken in conjunction with the accompanying drawings.

BRIEF DESCRIPTION OF THE DRAWINGS

FIGS. 4A-4C are perspective views of the carton feeding system, showing engagement and feeding of a carton blank by the overhead lug conveyor.

Figure 1A:
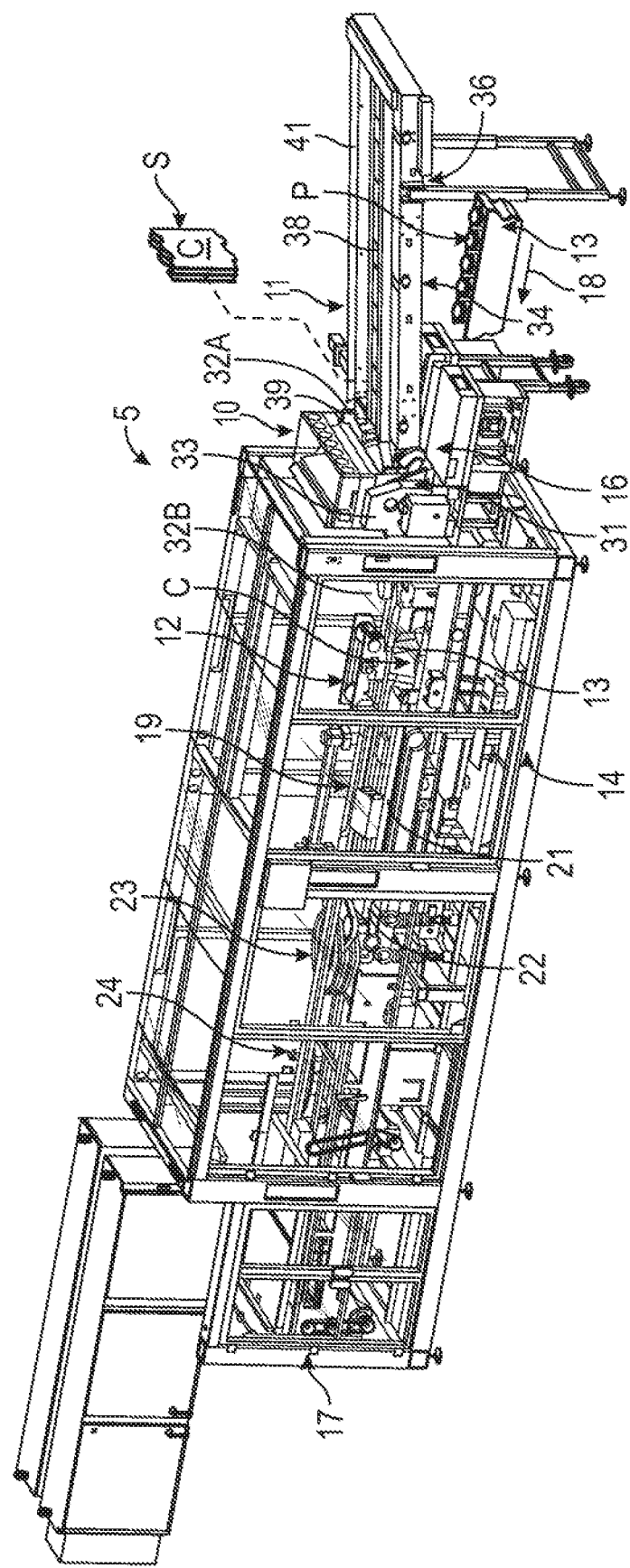
FIGS. 1A-1B are perspective views illustrating one embodiment of a packaging machine with a carton feeding system for feeding cartons for packaging articles or products according to the principles of the present invention.

Embodiments of the invention and the various features thereof are explained below in detail with reference to non-limiting embodiments and examples that are described and/or illustrated in the accompanying drawings. It should be noted that various features illustrated in the drawings are not necessarily drawn to scale, and that features of one embodiment may be employed with other embodiments as the skilled artisan would recognize, even if not explicitly stated herein. Those skilled in the art will thus appreciate and understand that, according to common practice, the dimensions of various features and elements of the drawings may be expanded or reduced to more clearly illustrate the embodiments of the present disclosure described herein. In addition, descriptions of certain components and processing techniques may be omitted so as to not unnecessarily obscure the embodiments and/or features of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

DETAILED DESCRIPTION

Referring now to the drawings in which like numerals indicate like parts throughout the several views, FIGS. 1A-7 illustrate aspects of a packaging machine 5 with a carton feeding system 10 according to the principles of the present invention. The carton feeding system 10 is illustrated as a feeding flat-blank, wrap style carton blanks C (FIGS. 2-5B) selected or picked from a stack of carton blanks S (FIG. 1A) supplied to and/or contained within a magazine 11 of the packaging machine for feeding by the carton feeding system 10 individually to a position to be picked up or transferred to an overhead lug conveyor 12 for moving the carton blanks into registration with articles/products or groups or articles/products P (FIGS. 1A and 6) moving along a product conveyor 13 of the packaging machine 5 or similar apparatus. The carton feeding system 10 further enables the velocity or rate of movement of the carton blanks fed from the carton feeder to be substantially controlled upstream from the engagement or registration point at which the carton blanks are applied to the products P with minimal added complexity and/or operating systems required for the operation of the carton feeding system.

Figure 6:
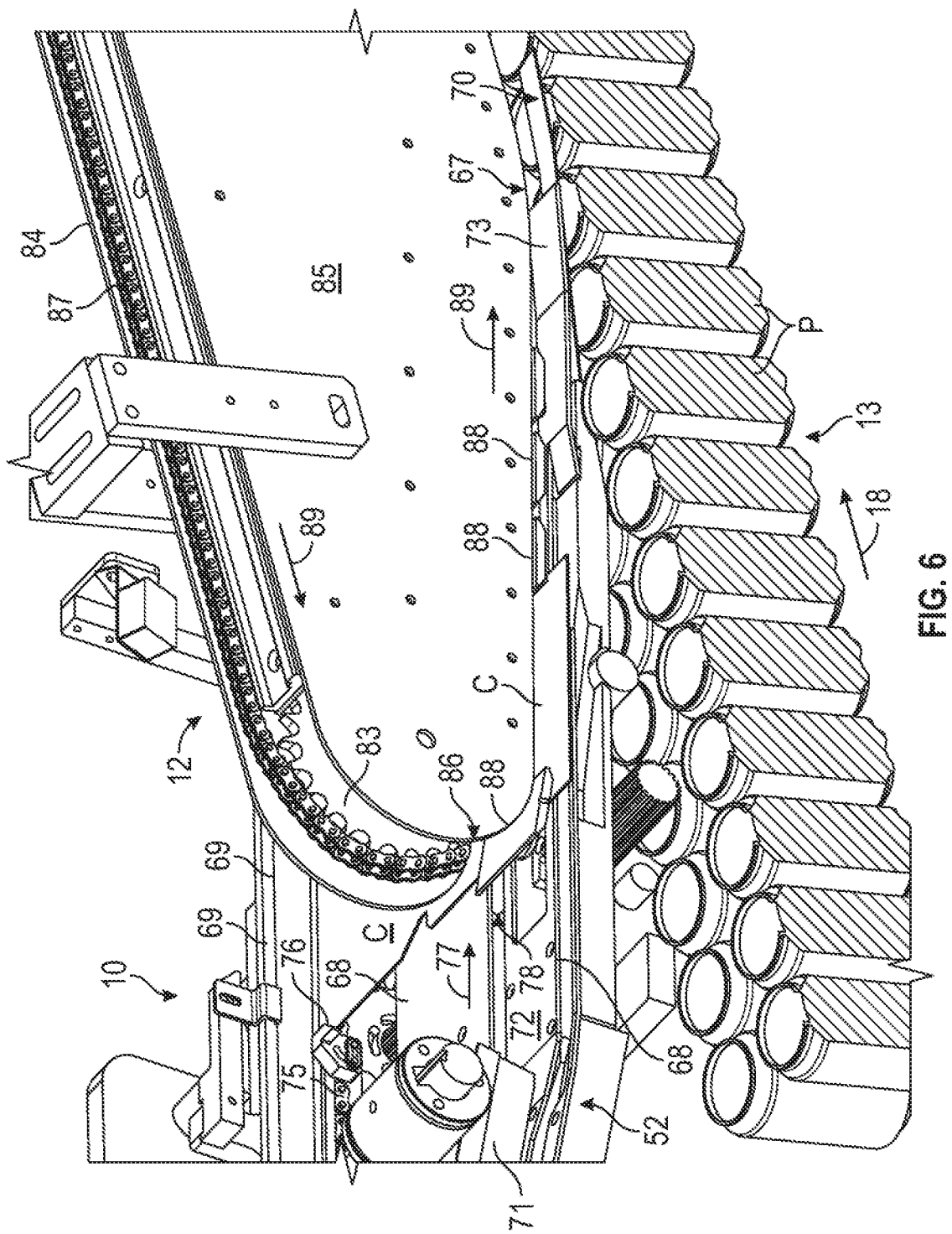
FIG. 6 is a perspective view showing the movement of a carton blank toward registration with a group of products.
Figure 7:
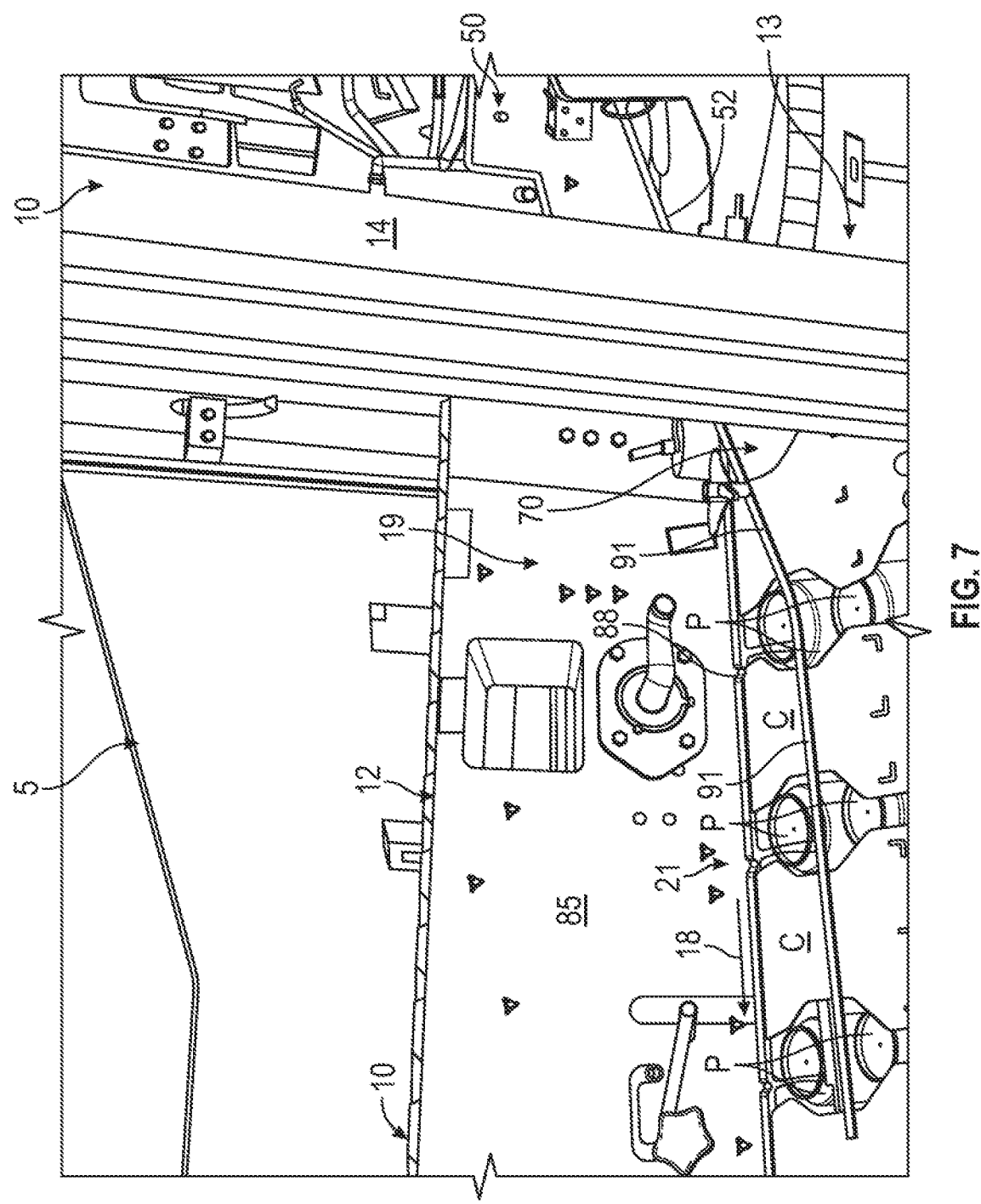
FIG. 7 is a perspective view showing the carton blanks moving through a packaging or wrapping station for application to groups of products.

As indicated in FIGS. 1A and 6-7, in one aspect, the articles/products P being packaged can include cans or bottles. However, a variety of other products also can be packaged, without departing from the scope of the present invention. The products further can be grouped, for example, into groups of 4, 6, 8, etc. for forming 4-packs, 6-packs, 8-packs, or any other size or configuration packages.

The packaging machine 5 (FIGS. 1A-1B) generally will include an elongated frame 14 with a first, upstream or input end 16 and a second, downstream or output end 17. A series of stations or assemblies are mounted or located along the frame, including the carton feeding system 10, generally located at the upstream end 16 of the packaging machine, the product conveyor 13 that extends through the frame and moves the products along a path of travel 18 through the packaging machine, and one or more wrapping or packaging assemblies 19.

The wrapping/packaging assemblies can include a series of carton folding elements or mechanisms 21 (FIG. 7) and tucking and/or locking mechanisms 22 (FIGS. 1A-1B) for securing the ends of the carton blanks about their associated products or groups of products P. Examples of such wrapping or packaging stations and carton blanks applied thereby are found in U.S. Pat. Nos. 9,776,750 and 6,550,608, the disclosure of which are incorporated by reference as if set forth fully herein; and as an additional or alternative mechanism, adhesive applicators could be provided.

The packaging machine 5 also can include a discharge or metering station 23 that controls discharge of the wrapped packages. The packages also can be fed to a downstream divider station or section 24, which can segregate the packages into one or more lanes and/or can turn or reorient the packages as needed for output thereof. An example of a turner/divider station can be found in U.S. Pat. No. 7,503,447, the disclosure of which is incorporated by reference as if set forth fully herein.

As illustrated in FIGS. 1A-4A, the carton feeding system 10 includes a frame 31 having upstream and downstream ends 32A and 32B, and adjustably spaced side frame members 33 supporting the operative elements of the carton feeding system therebetween. The magazine 11 generally is received/located at the upstream end 32A of the frame 31, and can include a magazine support frame 34 that can be adjustably mounted on legs or supports 36 (FIGS. 1A-1B), and can be connected to the frame 31 of the carton feeding system. The magazine support frame can be vertically adjustable to accommodate different size carton blanks. In addition, the magazine support frame can be adjusted laterally such as by an adjustment mechanism 37 (FIG. 1B), which can include an actuator such as a hand wheel or crank, motor, solenoid, or other actuator. This enables adjustment of the position of the magazine, and thus the stack of carton blanks therein, with respect to the operative elements of the carton feeding system.

One or more drive chains or belts 38 further can be provided along the magazine, and can engage the lower ends of the stack of carton blanks S for urging the stack of carton blanks forwardly and toward a picking position 39 to ensure consistency in the picking and removal of each selected carton blank C individually from the stack. The magazine 11 additionally can include a series of supports or tracks 41 on which the stack of carton blanks S can be received, with the carton blanks oriented in a forward facing, inclined attitude as they are moved toward the picking position 39 of the magazine.

Figure 2:
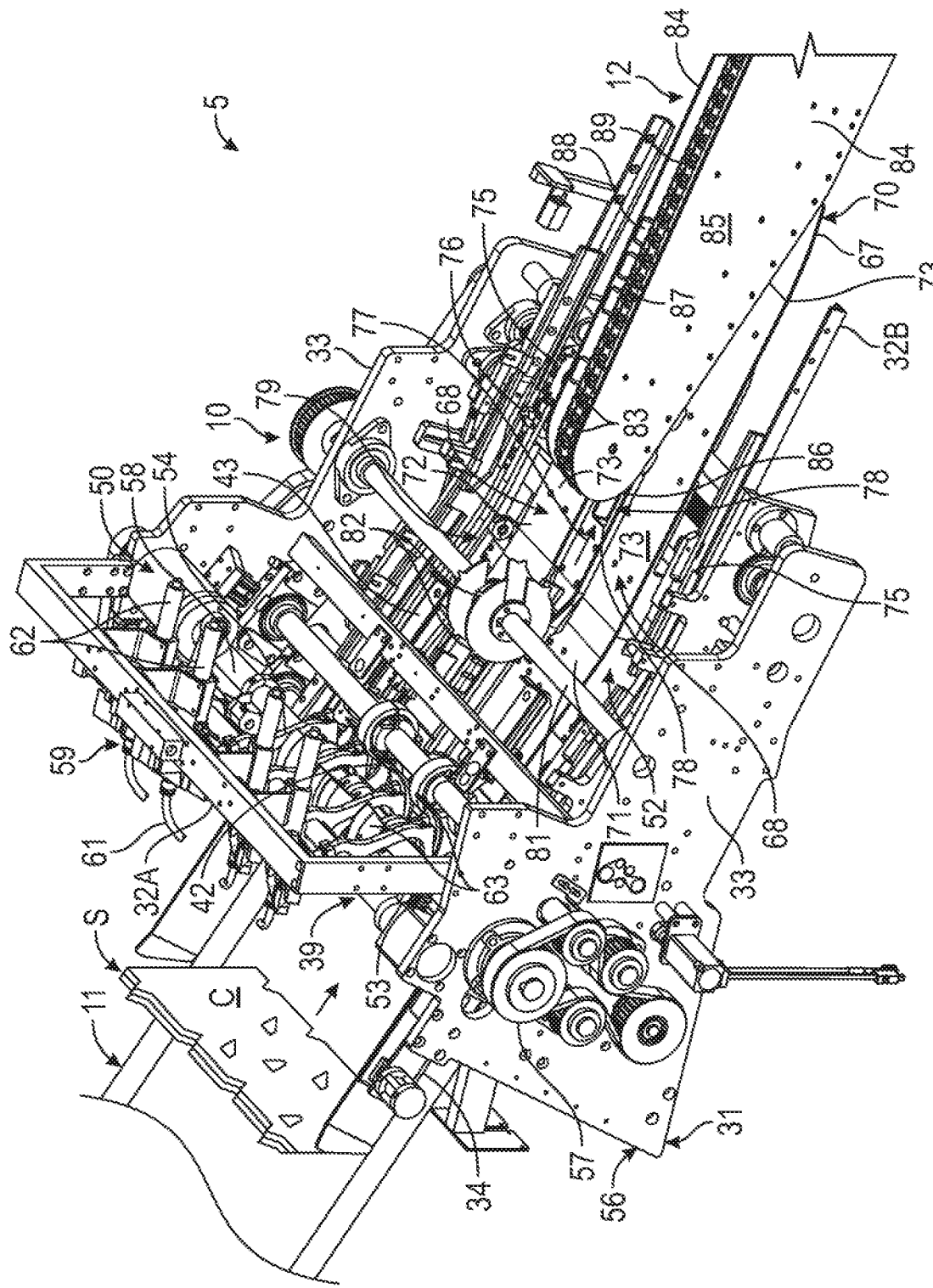
FIG. 2 is a perspective illustration of an embodiment of the carton feeding system according to the principles of the present invention.
Figure 4A:
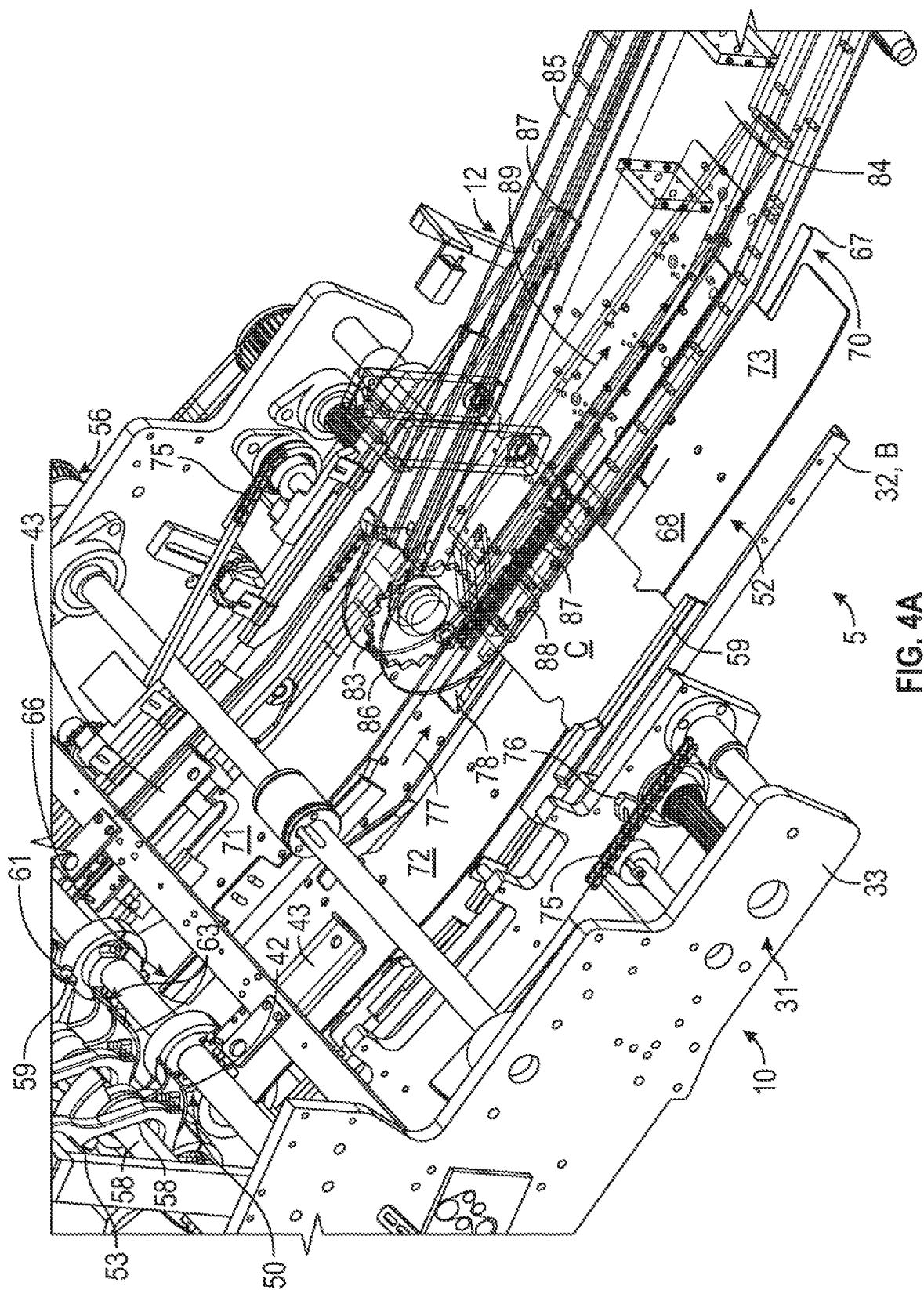
Figure 5A:
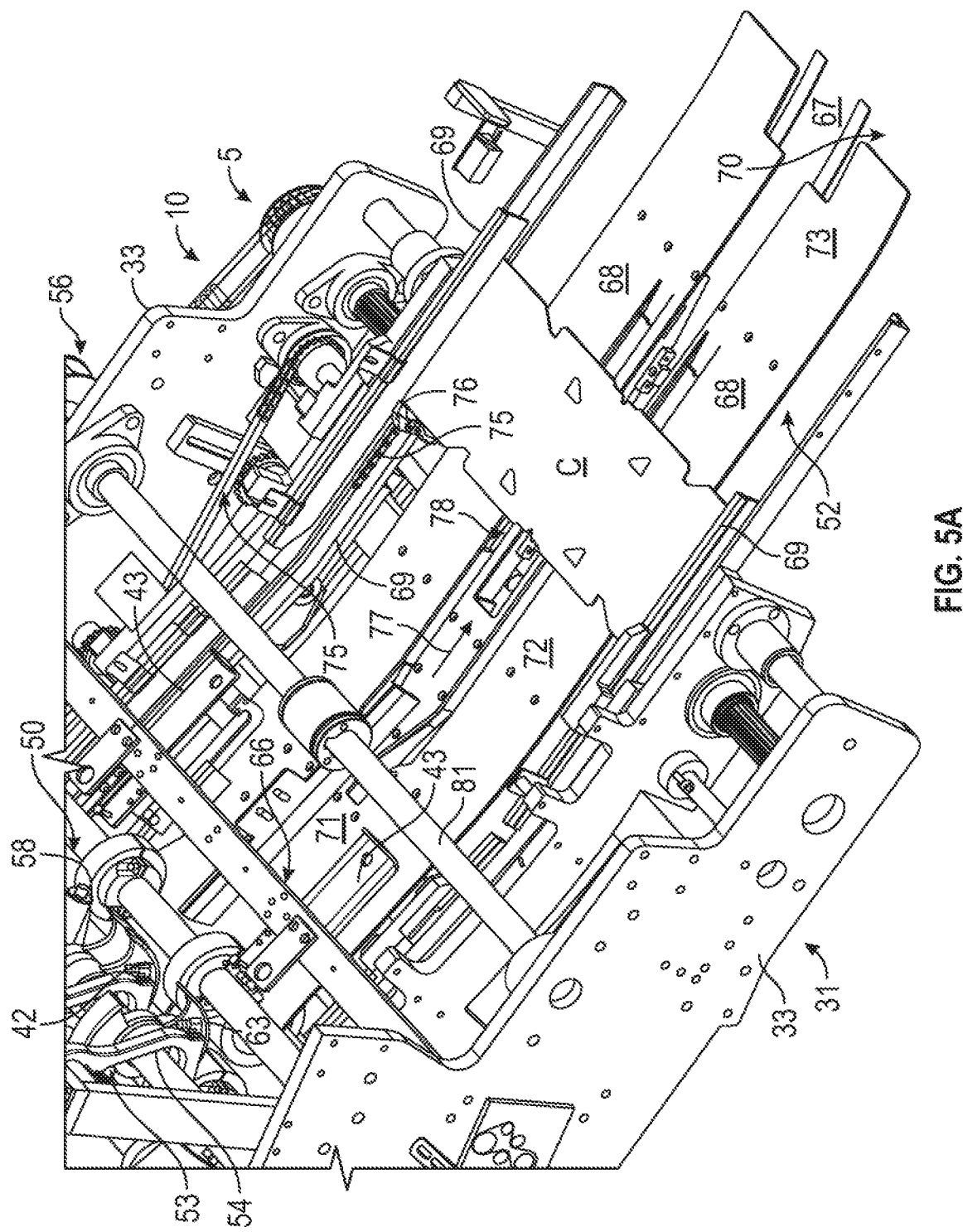
FIGS. 5A-5B are perspective views showing the movement of a carton blank along the carton chute of the carton feeding system.

As indicated in FIGS. 2, 4A and 5A, the carton feeder frame 31 also can be moveable or adjustable, such as vertically, to accommodate differences in the height and/or length of the stack of carton blanks, and further can include one or more forwardly sloped or slanted guides 42 adapted to enable the carton blanks C to bend or flex thereover during removal of the carton blanks from the stack of carton blanks. At least one lateral guide plate 43 further can be adjustably mounted to the magazine frame, and can be movable laterally thereacross to accommodate different length carton blanks and help ensure consistent stacking and feeding of the carton blanks from the magazine.

In the illustrated embodiment, the carton feeding system 10 further comprises a picking assembly 50 that is configured to pick carton blanks individually from the carton magazine 11 (FIG. 2). The picking assembly 50 transfers the carton blanks one-at-a-time from the stack S of carton blanks within the magazine to a carton chute 52 that is located below and extends downstream and away from the picking assembly 50. As shown in FIGS. 2-6, the carton chute 52 generally angles downwardly toward the path of movement 18 (FIG. 6) of the product groups P 78 moving along the product conveyor 13 (FIG. 6), and guides the carton blanks C from a release point of the picking assembly 50 where the picked cartons are released for feeding toward registration with corresponding product groups for wrapping thereabout.

As generally illustrated in FIG. 2, the picking assembly 50 can include a series of vacuum cups 53 mounted at the end of articulating arms 54. The articulating arms 54 generally are reciprocally driven by a drive mechanism or assembly 56, which can include a drive motor 57 and a series of belts and/or gears that control the reciprocating motion of the arms toward and away from the stack of carton blanks S being fed from the magazine 11. The articulating arms generally can be mounted on a driveshaft 58 that is driven by the drive assembly 56. Each of the vacuum cups 53 generally will be linked to a vacuum or air supply 59, which can include air lines 61 and one or more cylinders or other vacuum controls 62. A series of generally arcuate or curved guide plates 63 further can be mounted either to the articulating arms or to the driveshaft therefor, to further help guide the carton blanks as they are picked and removed from the stack of carton blanks of the magazine and fed to the carton chute 52.

As illustrated in FIGS. 2 and 4A-6, the carton chute 52 can have an elongated, substantially downwardly sloping configuration. The carton chute 52 further can comprise one or more sections extending from an upper or first end or section 66 adjacent the picking assembly 50, at an angle, downwardly toward a distal, second or downstream end 67 adjacent a registration point 70 (FIGS. 4A and 6) where the carton blanks will be applied to corresponding products or groups of products being moved therebelow by the product conveyor 13, as indicated in FIG. 6.

In one embodiment, the carton chute 52 can have one or a pair (or more) of spaced support plates 68 along which the carton blanks are moved for feeding into registration with their associated products or product groups. The carton chute further can include adjustable side plates 69 to enable adjustment of the width of the chute to accommodate different length or size carton blanks. The support plate 68 also can be angled or sloped toward the registration point 70 and can include a series of sections, such as an upstream or initial section 71, a second or intermediate section 72, and a downstream or end section 73.

Figure 3:
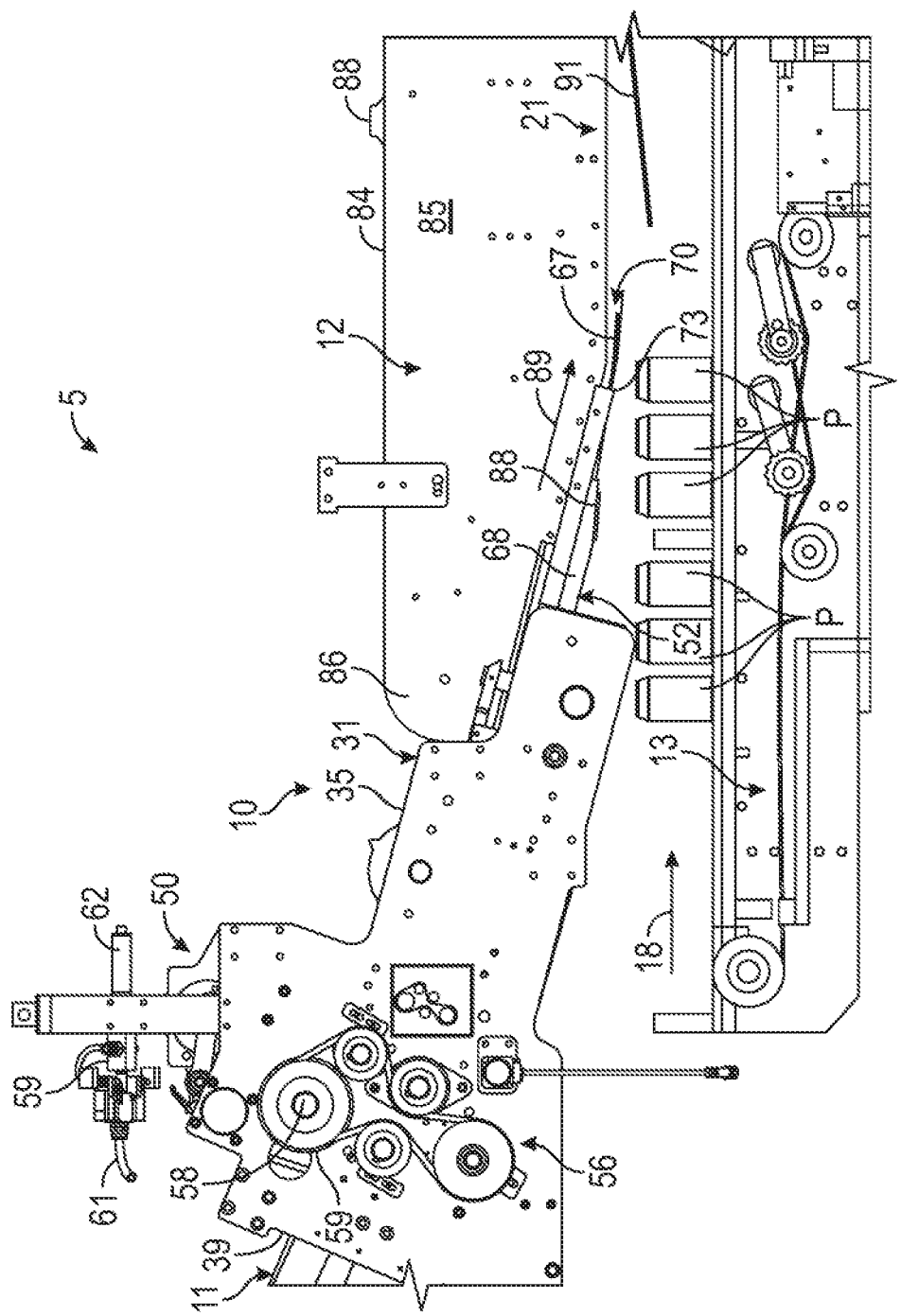
FIG. 3 is a side elevational view of the carton feeding system of FIG. 2.
Figure 4B:
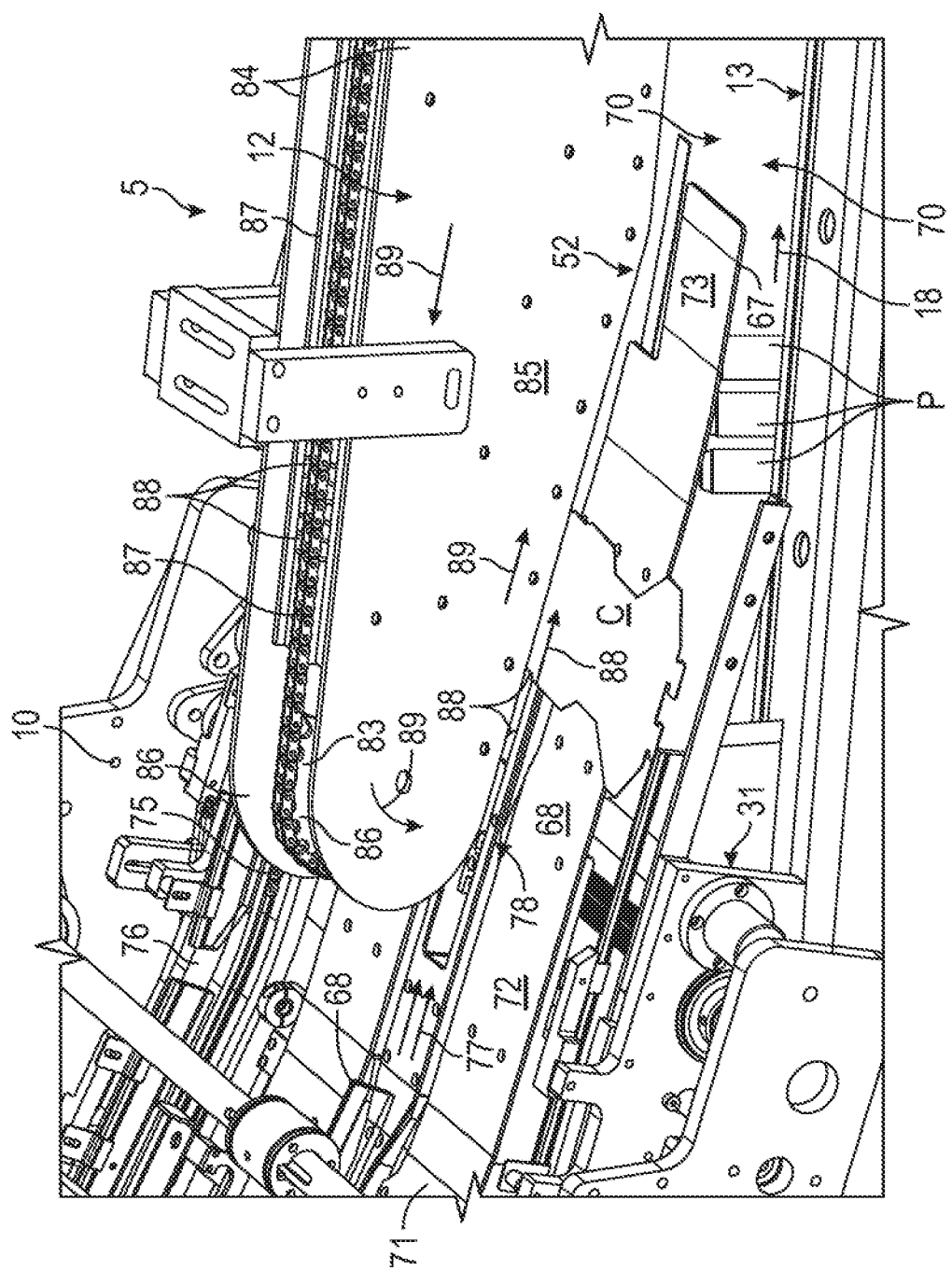
Figure 5B:
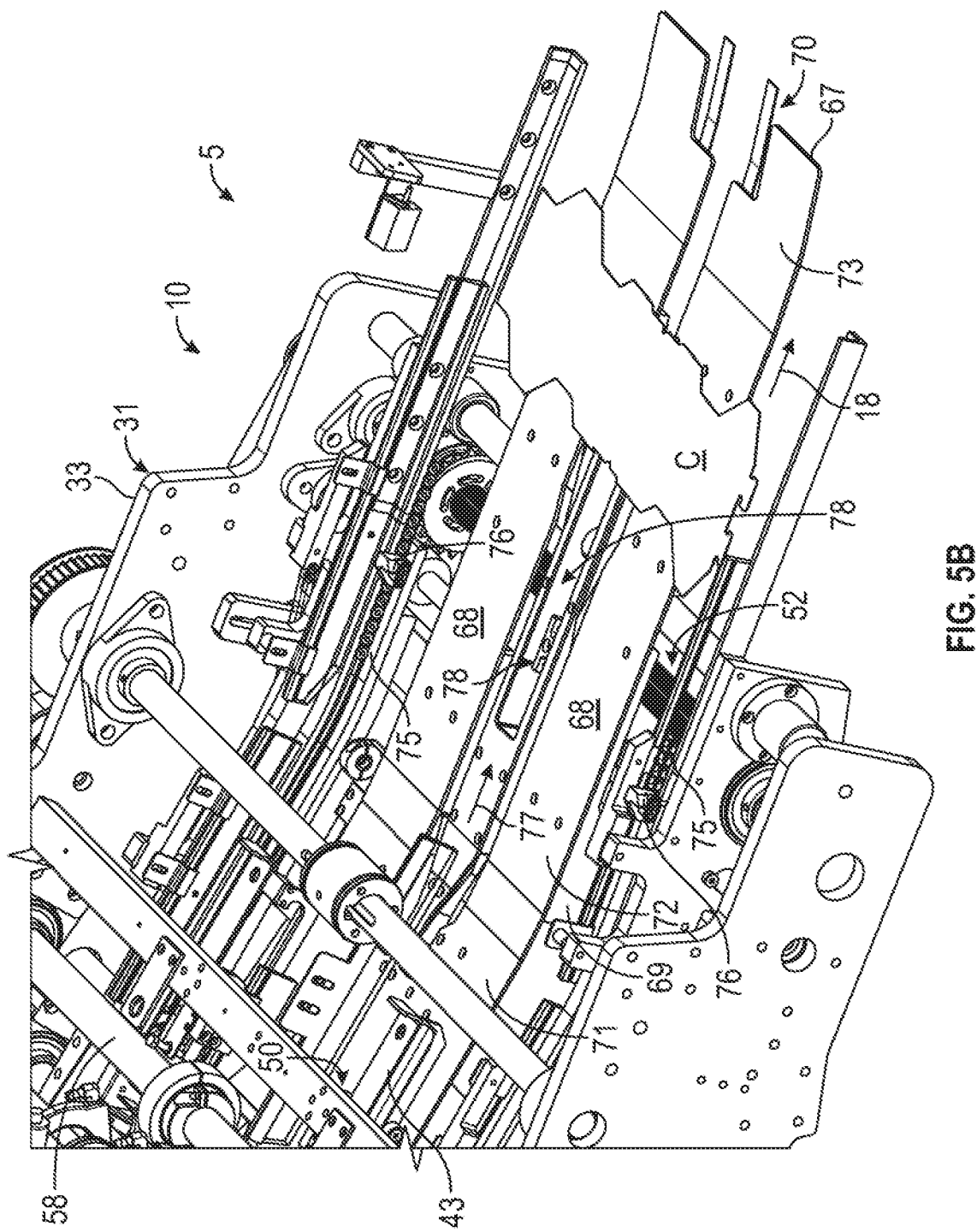

As indicated in FIGS. 3, 4B and 5B, the different sections of the support plate 68 can further be formed with different or varying angles, and can include additional or fewer angled sections or portions thereof. The length and angling of the carton chute generally will be selected and arranged so as to provide a substantially smooth guiding and deceleration of a rate of movement of the carton blanks as they are moved toward registration with their associated or corresponding products or groups of products at the registration or engaging point 70, as generally indicated in FIGS. 4B and 6.

As further generally illustrated in FIGS. 2, 4A and 4C-5B, a pair of drive chains or belts 75 generally are located on opposite sides of the carton chute 52, with each of the drive chains or belts 75 further including a series of spaced carton lugs 76 that are carried into engagement with a rear edge of each of the carton blanks deposited to the carton chute by the carton feeding assembly. As illustrated in the figures, at least one of the carton lugs 76 will engage the carton blank and urge or push the carton blank along a path of travel, indicated by arrow 77, along the carton chute as the carton blanks are released from engagement by the vacuum cups of the picking assembly (e.g. by release or disengagement of the vacuum being applied to the carton blanks by the vacuum cups). The carton lug(s) will move the carton blanks along their path of travel 77 toward a release point 78 at which the further movement of the carton blanks along the carton chute and toward registration with their corresponding products or groups of products will be handed off to the overhead lug conveyor 12.

While the figures generally illustrate at least one lug being in engagement with the carton blanks, the carton blanks further can be engaged by lugs on each side of the carton chute, with the location or positioning of the drive chains or belts of the carton lugs being adjusted by the adjustment of the side plates 69. Thus, the carton blanks can be engaged by the lugs of each of the chains or belts as needed depending on the size and/or configuration of the carton blanks.

As further illustrated in FIG. 2, once the carton blanks have been picked from the stack of carton blanks by the picking assembly and are fed onto the carton chute, typically being fed or guided onto the upper surface of the support plate 68, the carton blanks generally will be engaged by one or more carton lugs 76 and will be released from engagement by the vacuum cups of the feeding assembly 50. The feeding assembly thereafter can be reciprocated into engagement with a next carton of the stack of carton blanks within the magazine 11 as the previously picked carton blank is moved along the carton chute. A rotating guide wheel 79 also can be provided substantially along a center portion or the path of travel 77 of the carton blanks. The guide wheel 79 can have a substantially circular construction so as to rotate with the rotation of the driveshaft 81 and further can include a series of projections and/or tab forming elements 82 that can engage and open or form locking or other features of the carton blanks.

The overhead lug conveyor 12 generally is illustrated in FIGS. 2, 3-4C and 6. The overhead lug conveyor 12 can include an elongated frame 85 having spaced side plates 84 and an upstream end 86 that extends into and is received within the confines of the frame 31 of the carton feeding assembly 10. Rather than being located downstream from the carton feeding assembly, the overhead lug conveyor thus is effectively extended and moved into a cooperative relationship with the carton feeding assembly, with the upstream or first end 86 of the overhead lug conveyor 12 being located along the carton chute 52 adjacent the release point 78 where the carton lugs are released from driving engagement with the carton blanks, which release point further is substantially upstream of the discharge or downstream end 67 of the carton chute. The overhead lug conveyor further can be configured and aligned so as to extend at an angle that substantially tracks an angle at which the carton chute is oriented with respect to the product conveyor therebelow.

The overhead lug conveyor 12 also will include one or more chains or belts 87 extending about sprockets or pulleys 83 at each end of the frame, and driven by a motor or other drive mechanism, and which carry a series of overhead lugs 88 along a substantially elliptical path 89 into engagement with the carton blanks C. The overhead conveyor lugs will engage the carton blanks at the release point 78 at which the overhead conveyor lugs are disengaged, and will take over the movement of the carton blanks along the remaining length of the carton chute, while the carton lugs are generally released from driving engagement with the carton blanks and allowed to rotate or pivot out of engagement, as they are further moved along a reciprocal portion of their elliptical path, back toward their initial portion for picking up engagement of a next carton deposited on the carton chute by the feeding assembly.

The lugs 88 of the overhead lug conveyor 12 generally will be pitched at a different pitch than the carton lugs carried by the drive belts or chains of the carton conveyor. For example, the lugs 88 can be pitched at about 7"-7.8" pitch versus a 9"-9½" pitch for the carton lugs, though other, differing pitches also can be used. The lugs of the overhead lug conveyor also will be moved at a rate of movement that is substantially matched to a rate of movement of the products or groups of products P (FIG. 6) being moved along the product conveyor 13 therebelow. In one aspect, the drive motor of the overhead conveyor can drive the lug chains or belts 87 at a rate that substantially matches the rate of movement of the product conveyor. Alternatively, the overhead lug conveyor chains or belts can be linked to and driven (e.g., by belts or other connection) by the motor or drive for the product conveyor so as to move in a timed movement/relationship therewith.

The engagement of the carton blanks by the overhead conveyor lugs at the release point 78, generally defined along the intermediate portion of the carton chute, and substantially upstream from the discharge or registration point 70 between the carton blanks and their associated or corresponding products or product groups, allows the carton blanks to be smoothly transitioned and picked up by the overhead conveyor lugs for their continued movement along the carton chute at a pitch substantially matching the pitch or rate of movement of the products along their path of travel by the product conveyor, as the carton lugs of the carton conveyor chains or belts are released from driving engagement with the carton blanks. Thereafter, the lugs of the overhead lug conveyor will continue to move the carton blanks along the carton chute and toward their registration point, and as they do so, the rate of movement of the carton blanks will be controlled so the carton blanks are decelerated to substantially match the rate of movement of the products or product groups passing therebelow while the carton blanks are still within the carton feeder and prior to the carton blanks reaching the registration point 70, as indicated in FIG. 6. As a result, a substantially smooth transition and control of the speed of the carton blanks can be provided with the rate of movement of the carton blanks being controlled while the carton blanks are still within the feeder and prior to their being moved into registration with their corresponding or associated products or groups of products.

Figure 1B:
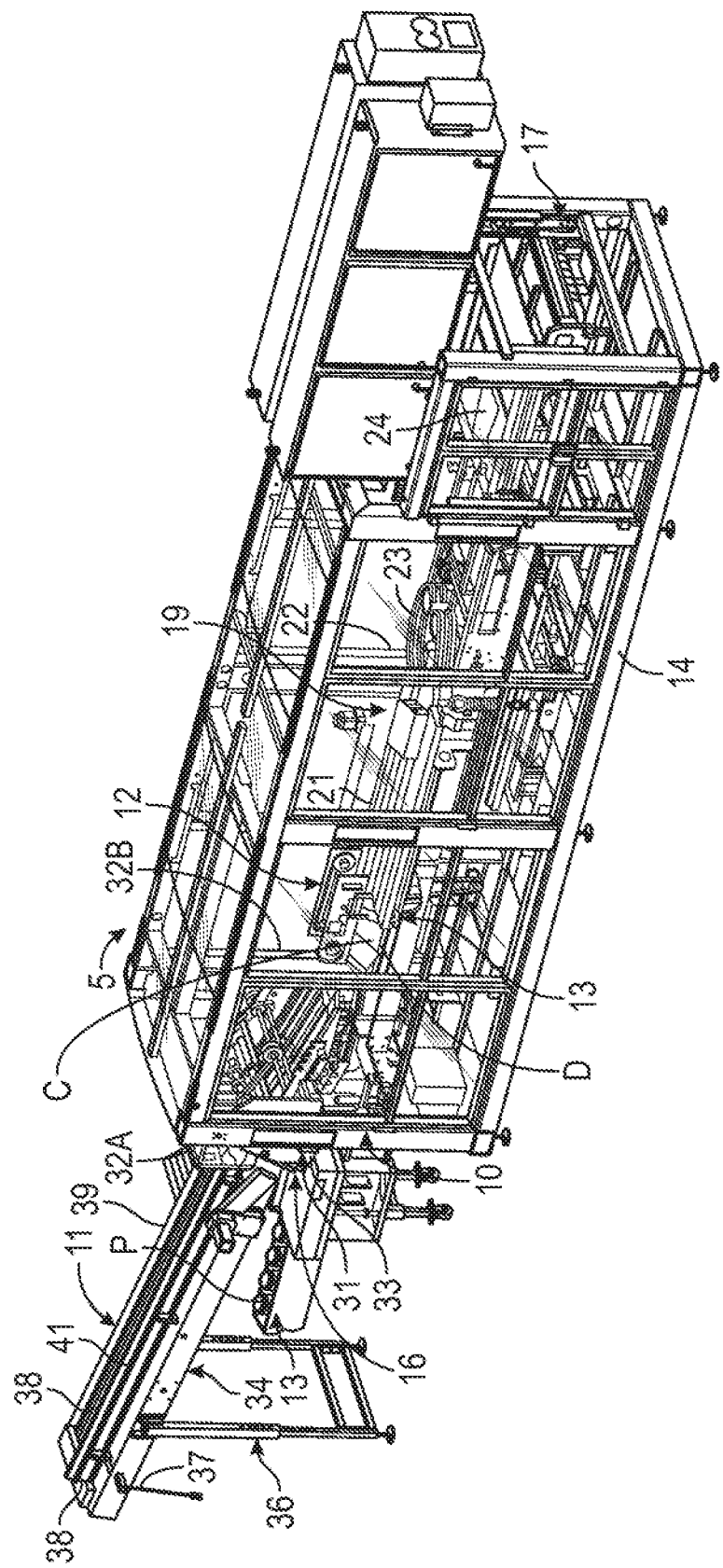

Thereafter, as generally indicated in FIGS. 1A-1B and 7, with the carton blanks C in registration with their products or product groups, the overhead lug conveyor 12 thereafter will continue to move the carton blanks with the movement of the products or product groups by the product conveyor and into the downstream packaging and/or wrapping stations 19 wherein the sides of the carton blanks can be folded or wrapped about the products and the ends of the carton blanks can be secured together, such as by moving along rails 91 for folding of the sides of the carton blanks (FIG. 7), and further moving locking tabs into engagement and/or applying an adhesive material. Once the packages are completed or formed, they can be passed through a channel and/or through compression belts of a discharge station of the packaging machine, as indicated in FIGS. 1A-1B. From the discharge, the completed packages further can be fed to the divider where they can be separated and/or turned or reoriented as needed to segregate and/or align the products for release or discharge from the packaging machine.

The foregoing description of the disclosure illustrates and describes various embodiments. As various changes can be made to the above construction without departing from the spirit and scope of the present invention as disclosed herein, it is intended that all matter contained in the above description or shown in the accompanying drawings shall be interpreted as illustrative and not in a limiting sense. Furthermore, the scope of the present disclosure shall be construed to cover various modifications, combinations, alterations, etc., of the above-described embodiments that are within the scope of the claims of this application.

Additionally, while the disclosure shows and describes selected embodiments of the present invention, the invention is capable of use in various other combinations, modifications, and environments, and is capable of undergoing a variety of changes or modifications than the scope of the inventive concepts as expressed herein, commensurate with the above teachings, and/or within the skill or knowledge of the relevant art. Furthermore, various features and characteristics of each embodiment may be selectively interchanged and applied to the other illustrated and non-illustrated embodiments of the disclosure.

The invention claimed is:

1. A packaging machine comprising:
a product conveyor moving a series of products through the packaging machine;
a carton magazine for supplying a stack of carton blanks;
a carton feeding system arranged above the product conveyor adjacent the carton magazine, the carton feeding system comprising:
a picking assembly arranged adjacent the magazine and configured to selectively pick carton blanks from the magazine;
a carton chute that extends away from the magazine and toward the product conveyor, the carton chute configured to receive the carton blanks from the picking assembly and including a series of carton lugs movable into engagement with the carton blanks fed to the carton chute for urging the carton blanks along the carton chute and away from the picking assembly, and
an overhead lug conveyor having a series of lugs carried into engagement with the carton blanks and which continue movement of the carton blanks along the carton chute and into registration with corresponding products or groups of products moving along the product conveyor;
wherein the overhead lug conveyor has an upstream end that projects rearwardly along the carton chute, extending above and substantially aligned with the carton chute at a location adjacent a release point wherein the carton blanks are released from engagement by the carton lugs along the carton chute and the carton blanks are engaged by the lugs of the overhead lug conveyor and movement of the carton blanks along the carton chute and toward registration with the corresponding products or groups of products is continued by engagement of the carton blanks with the lugs of the overhead lug conveyor and movement of the lugs of the overhead lug conveyor, the lugs of the overhead conveyor having a pitch and moving at a rate that imparts a rate of movement to the carton blanks that substantially matches a rate of movement of the products along the product conveyor; and
at least one packaging or wrapping station downstream from the carton feeding system, in which the carton blanks are applied about their corresponding products or product groups.

2. The packaging machine of claim 1, wherein the carton feeding system further comprises drive belts or chains extending at least partially along the carton chute and along which the carton lugs are mounted in spaced series, and wherein the carton lugs are arranged at a pitch that is greater than the pitch of the lugs of the overhead conveyor.

3. The packaging machine of claim 1, wherein the carton chute comprises one or more sections extending downwardly and forwardly at an angle from an upstream section adjacent the picking assembly to a distal section terminating approximately at a registration point at which the cartons are applied to their corresponding products or groups of products.

4. The packaging machine of claim 1, wherein the at least one packaging or wrapping station comprises a series of guide rails that engage and direct portions of the carton blanks toward folded position along their corresponding products or groups of products.

5. The packaging machine of claim 1, wherein the carton chute comprises one or more sections extending from adjacent the picking assembly at a downwardly sloping angle, and wherein the overhead conveyor includes a frame having an upstream portion extending from the release point downwardly at an angle and substantially parallel to the carton chute.

6. A method of packaging products, comprising:
moving a series of products along a path of travel on a product conveyor through a packaging machine;
picking carton blanks from a carton magazine and placing the carton blanks into a carton chute with a picking assembly of a carton feeding system;
moving the carton blanks along the carton chute with one or more carton lugs;
engaging the carton blanks with a series of lugs of an overhead lug conveyor as the carton blanks are within the carton chute at a release point of the carton blanks from the one or more carton lugs moving the carton blanks along the carton chute, wherein the lugs of the overhead conveyor are at a different pitch than the one or more carton lugs, the engaging the carton blanks with the series of lugs of the overhead conveyor comprises moving one or more lugs of the overhead conveyor into engagement with the carton blanks at the release point where the carton blanks are released from engagement with the one or more carton lugs while the carton blanks remain within the carton chute and moving the carton blanks along the carton chute and toward registration with the corresponding products or groups of products by movement of the lugs of the overhead lug conveyor;
moving the carton blanks with the overhead lugs along the carton chute and toward registration with the products moving along the path of travel, wherein as the carton blanks approach registration with the products, the carton blanks are moving at a rate of movement substantially matched to a rate of movement of the products along the product conveyor; and
applying the carton blanks to corresponding products or groups of products to form a product package.

7. The method of claim 6, wherein the lugs of the overhead conveyor are moved along a path substantially parallel to a path defined by the carton chute as they move the carton blanks toward registration with the products.

8. The method of claim 6, wherein the lugs of the overhead conveyor are moved at a rate substantially matching the rate of movement of the products along the product conveyor to control deceleration of the carton blanks to match the rate of movement of the products for application thereto.

9. The method of claim 6, wherein picking the carton blanks comprises applying a vacuum to each carton blank, drawing each carton blank from a stack of cartons, feeding the carton blank to the carton chute and releasing the vacuum applied thereto.

10. The method of claim 9, wherein the carton blanks are engaged by the one or more carton lugs as the vacuum is released, and wherein the one or more carton lugs move the carton blanks at a faster rate than the rate of movement of the lugs of the overhead conveyor.

11. A carton feeding system for feeding carton blanks into registration with groups of products moving along a product conveyor through a packaging machine, the carton feeding system comprising:
a frame arranged above the product conveyor of the packaging machine;

a picking assembly arranged at an upstream end of the frame and configured to selectively pick carton blanks from a stack of carton blanks;

a carton chute that extends along the frame downwardly and at an angle toward the product conveyor, the carton chute configured to receive the carton blanks from the picking assembly and having a series of carton lugs movable into engagement with the carton blanks fed to the carton chute and moving the carton blanks along the carton chute and away from the picking assembly at a first rate, and an overhead lug conveyor having a series of lugs carried into engagement with the carton blanks and which continue movement of the carton blanks along the carton chute and into registration with corresponding products or groups of products moving along the product conveyor;

wherein the overhead lug conveyor is received at least partially within the frame, with an upstream end of the overhead conveyor extending above and substantially aligned with the carton chute at a location adjacent a release point wherein the carton blanks are released from engagement by the carton lugs along the carton chute and the carton blanks are engaged by the lugs of the overhead lug conveyor and movement of the carton blanks along the carton chute and toward registration with the corresponding products or groups of products is continued by engagement of the carton blanks with the lugs of the overhead lug conveyor and movement of the lugs of the overhead lug conveyor, the lugs of the overhead conveyor having a pitch and moving the carton blanks at a second rate that imparts a rate of movement to the carton blanks that substantially matches a rate of movement of the products along the product conveyor.

12. The carton feeding system of claim 11, wherein the carton chute comprises one or more sections extending downwardly and forwardly at an angle from an upstream section adjacent the picking assembly to a distal section terminating approximately at a registration point at which the cartons are applied to their corresponding products or groups of products.

13. The carton feeding system of claim 11, wherein the carton feeding system further comprises drive belts or chains extending at least partially along the carton chute and along which the carton lugs are mounted in spaced series, and wherein the carton lugs are arranged at a pitch that is greater than the pitch of the lugs of the overhead conveyor.

14. The packaging machine of claim 11, wherein the overhead lug conveyor feeds the carton blanks moving in registration with associated groups of products to at least one packaging or wrapping station comprising a series of guide rails that engage and direct portions of the carton blanks toward folded position along their corresponding products or groups of products.

* * * * *